United States Patent
Kumar et al.

(10) Patent No.: US 8,745,997 B2
(45) Date of Patent: Jun. 10, 2014

(54) OPTIMIZED COOLING FOR VEHICLE WITH START-STOP TECHNOLOGY

(75) Inventors: Mukesh Kumar, Canton, MI (US);
Debasish Dhar, Canton, MI (US);
Mitali Chakrabarti, Canton, MI (US);
Ken J. Jackson, Dearborn, MI (US);
Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 534 days.

(21) Appl. No.: 13/151,519

(22) Filed: Jun. 2, 2011

(65) Prior Publication Data
US 2012/0304670 A1 Dec. 6, 2012

(51) Int. Cl.
*B60H 1/32* (2006.01)
*F25B 49/00* (2006.01)

(52) U.S. Cl.
USPC .................. 62/133; 62/228.1; 62/241; 62/243

(58) Field of Classification Search
USPC .................. 62/133, 228.1, 229, 241, 243, 244
See application file for complete search history.

(56) References Cited

U.S. PATENT DOCUMENTS

| | | |
|---|---|---|
| 4,425,765 A | 1/1984 | Fukushima et al. |
| 6,481,225 B2 | 11/2002 | Kimura et al. |
| 6,662,580 B2 | 12/2003 | Suitou et al. |
| 6,745,585 B2 | 6/2004 | Kelm et al. |
| 6,823,690 B2 | 11/2004 | Runk et al. |
| 7,096,680 B2 | 8/2006 | Sugesawa et al. |
| 7,484,375 B2 | 2/2009 | Engel |

OTHER PUBLICATIONS

Changwon Lee et al., Speed Sensitive Air Conditioning System for Fuel Economy and Power Performance, ATZ Worldwide eMagazine, Nov. 2011, pp. 38-43.

*Primary Examiner* — Marc Norman
(74) *Attorney, Agent, or Firm* — Vichit Chea; MacMillan, Sobanski & Todd, LLC

(57) ABSTRACT

An air conditioning system for a start-stop vehicle employs a compressor with a variable displacement. A controller determines a normal Climate Thermal Load (CTL) value for controlling a variable stroke of the variable displacement compressor. A stop event is detected in response to a speed of the vehicle and the occurrence of a predetermined deceleration. During the stop event, the variable stroke is increased by an amount determined in response to the normal CTL value, the speed of the vehicle, and a measure of the deceleration of the vehicle so that an evaporator temperature within the air conditioning system is allowed to decrease while the vehicle is stopping so that climate comfort can be maintained even while the engine is shut off during the subsequent time that the vehicle is stopped.

20 Claims, 3 Drawing Sheets

OPTIMIZED COOLING FOR VEHICLE WITH START-STOP TECHNOLOGY

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to vehicular air conditioning systems with variable displacement compressors, and, more specifically, to optimizing an increased cooling during a stop event so that passenger comfort is maintained during a stopped condition of the vehicle with the engine also stopped.

Fuel economy of automobiles is an important attribute of vehicle performance, and is determined by the technology employed in its design, by driver behavior and actions, and by conditions under which the vehicle is used (e.g., speed, road design, weather, and traffic). Manufacturers continuously strive to deliver better fuel economy. One technology being increasingly used is Stop-Start, wherein an internal combustion engine automatically shuts down when the vehicle comes to a stop and then restarts as needed to reduce the amount of time the engine spends idling (e.g., while waiting at a traffic light), thereby improving fuel economy and reducing emissions. Start-Stop technology can provide a 5% to 10% improvement in fuel economy.

In addition to vehicle propulsion, the engine drives other vehicle systems such as an air conditioning compressor. Occupant comfort must be maintained during the time that the engine is stopped. Since the air conditioning compressor runs on a front-end-accessory-drive (FEAD) belt driven by the engine, the compressor does not run when the engine is stopped. Thus, when the air conditioning system is actively being used and the engine stops during a vehicle stop, the cooling action is interrupted and the passenger cabin may become warmer. If the temperature increases by a certain amount, the engine is usually restarted so that cooling resumes, but some of the fuel economy improvement is lost.

For improved efficiency and performance, many vehicles now use variable displacement compressors. By varying the displacement of the compressor (e.g., by adjusting the piston stroke) to match the cooling needed at any particular time, the engine load is reduced when cooling demand is lower. The stroke can be electrically controlled via a swash plate, for example, within a range of 0% to 100% of the maximum stroke. By appropriately controlling the stroke, fuel economy improvements are realized during running of the engine.

In connection with the use of a variable displacement compressor in a vehicle with Start-Stop technology, it has been recognized that it can be beneficial to increase the stroke during coasting of the engine so that energy in the coasting engine that would otherwise be wasted can be regenerated into extra cooling. This allows the compressor to temporarily run at a lower stroke once the engine restarts. Examples of this regenerative cooling include U.S. Pat. No. 7,484,375 to Engel and U.S. Pat. No. 4,425,765 to Fukushima et al.

In known systems, however, a maximum cooling effect is obtained during coasting which leads to disadvantages. Unless a cold storage means is provided in the evaporator, the cooling of the passenger cabin may become uncomfortable. A sufficient cold storage capacity to avoid discomfort may be high. Moreover, many vehicles with Start-stop do not stop running during vehicle coasting, but only stop once the vehicle has come to a full stop. Therefore, the increased compressor stroke would actually increase engine load (and fuel consumption) during coasting.

It would be desirable to optimize the amount of extra cooling obtained during the slowing down and stopping of a vehicle equipped with a variable displacement compressor and start-stop technology. As a result, the time delay before the engine must be restarted during a vehicle stop due to increasing cabin temperature is optimized.

SUMMARY OF THE INVENTION

In one aspect of the invention, a vehicular air conditioning system is provided for a vehicle having a start-stop technology. An evaporator is monitored by an evaporator temperature sensor for generating an evaporator temperature signal according to a temperature of the evaporator. An exterior temperature sensor generates an exterior temperature signal according to a temperature outside of the vehicle. An occupant control element is used to set an occupant demand signal. A variable displacement compressor is driven by the engine and has a variable stroke for generating a variable amount of cooling of the evaporator in response to a stroke control signal. A vehicle speed sensor generates a speed signal according to an instantaneous speed of the vehicle. A controller receives the evaporator temperature signal and the speed signal. The controller determines a Climate Thermal Load (CTL) value in response to the exterior temperature signal and the occupant demand signal. The controller determines an evaporator target temperature in response to the CTL value. The controller varies the variable stroke to keep the evaporator temperature signal near the evaporator target temperature. The controller detects a stop event of the vehicle in response to the speed signal being less than or equal to a threshold speed and the occurrence of a deceleration. During the stop event, the controller determines the evaporator target temperature in response to a modified CTL value determined in response to the CTL value, the speed signal, and a magnitude of the deceleration.

DETAILED DESCRIPTION OF PREFERRED EMBODIMENTS

The present invention is particularly applicable to vehicles having an internal combustion engine equipped with start-stop technology and an externally controlled variable displacement compressor (EVDC). When traveling at less than a threshold speed (e.g., 35 mph) and a predetermined deceleration is detected (e.g., the driver applies a predetermined amount of braking or the vehicle speed is dropping by a predetermined amount), then a stop event is detected by a vehicle controller. The predetermined amount of braking can be defined according to a certain angular position of the brake pedal or a certain rate of movement of the pedal. As used herein, the "stop event" refers to the time that the vehicle is reducing speed and comes to a stop. Preferably the engine continues to run during the stop event, but it is also possible to stop the engine prior to reaching a zero speed. A goal of a preferred embodiment is to optimize the evaporator temperature so that just the right amount of additional cooling is achieved during the stop event that maintains a comfortable cabin temperature during the time that the vehicle remains at zero speed with the engine off. Thus, the compressor is controlled by moving it into an optimum stroke rather than into full stroke. This will reduce the evaporator temperature to an optimum value rather than the lowest evaporator temperature possible before the engine shutoff. This strategy improves fuel economy by increasing the engine shutoff time before it becomes necessary to reactivate the compressor and by reducing compressor power consumption during the stop event since the compressor stroke is optimized instead of being maximized.

Figure 1:
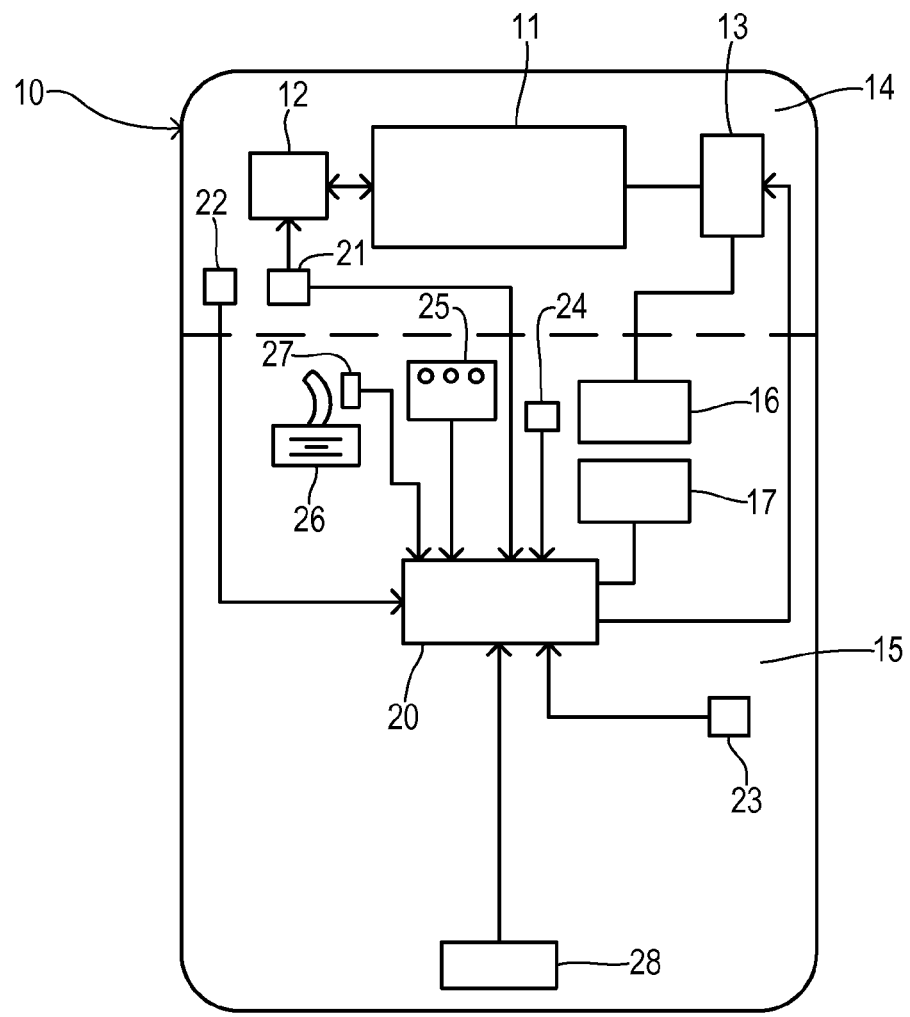
FIG. 1 is a block diagram showing a vehicle employing one embodiment of the present invention.

Referring now to FIG. 1, a vehicle 10 includes an engine 11 equipped with the start-stop feature wherein the engine can be automatically shut down during times when the vehicle is not moving and then automatically restarted as necessary when the vehicle begins to move again or when it becomes necessary to operate is accessories off of the engine. An engine controller 12 is connected to engine 11 for performing the start-stop functions. Engine 11 drives an externally controlled variable displacement compressor 13 which resides in an engine compartment 14 along with engine 11 and controller 12.

Vehicle 10 includes a passenger cabin 15 which contains an evaporator 16 and a blower 17 of an automotive HVAC system. A controller 20 is connected to blower 17 for commanding a certain blower speed and to compressor 13 for commanding a desired stroke of the compressor. Controller 20 is connected to various sensors and other inputs for determining the appropriate value for the compressor stroke. A vehicle speed sensor 21 provides an instantaneous speed signal to controller 20 and to engine controller 12. An exterior temperature sensor 22, which may be located in engine compartment 14, generates an exterior temperature signal according to a temperature outside of the vehicle which is provided to controller 20. Similarly, an internal temperature sensor 23 generates an internal temperature signal and provides it to controller 20. An evaporator temperature sensor 24 associated with evaporator 16 generates an evaporator temperature signal according to the actual temperature within the evaporator and provides it to controller 20.

An occupant control element or control head 25 is used by the driver or other vehicle occupant to set a desired temperature and/or blower speed for the cooling of vehicle cabin 15. Element 25 generates an occupant demand signal which is sent to controller 20 in a conventional manner.

A stop-event (i.e., the vehicle slowing to a stop) can be detected in response in part to the occurrence of a deceleration. In one embodiment, the deceleration can be detected by monitoring the position of a brake pedal 26 using an angle/position sensor 27 that provides an angle signal representing the instantaneous brake pedal angle to controller 20.

In some embodiments of the invention, the desired compressor stroke may be determined in response to a sunload on the vehicle. Thus, a sunload sensor 28 such as a light intensity sensor provides a sunload signal to controller 20. Controller 20 may use the foregoing input signals to determine a target evaporator temperature and/or compressor stroke as described below.

Figure 2:
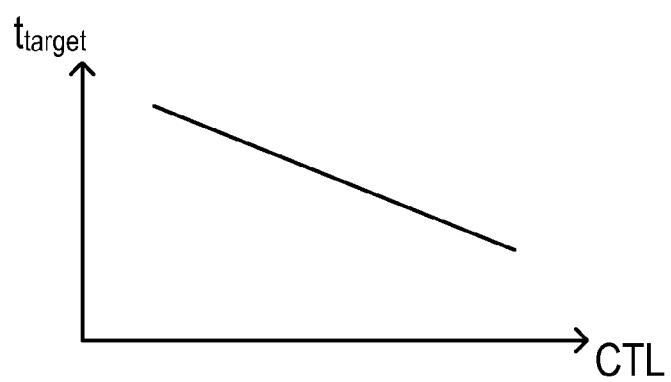
FIG. 2 is a graph showing a relationship between Climate Thermal Load and a target evaporator temperature.

Operation of the air conditioning system has conventionally employed a measure known as the Climate Thermal Load (CTL). The CTL quantifies the amount of cooling needed from the air conditioning system based on the exterior temperature, occupant demand settings, actual interior temperature, and sunload, for example. Other variables may also be used in determining the CTL. As shown in FIG. 2, the CTL is used to determine a target temperature $t_{target}$ for the evaporator. The higher the CTL, the more cooling work that must be done by the evaporator and the lower the evaporator target temperature is set. When the actual evaporator temperature is higher than $t_{target}$, then the air conditioning controller increases the compressor stroke to obtain more cooling and reach the desired evaporator temperature. When the CTL has a lower value, the compressor stroke is controlled to obtain a higher evaporator $t_{target}$. Thus, by lowering evaporator temperature $t_{target}$, the compressor stroke will be correspondingly increased until the lower target is achieved. Furthermore, by forcing an increase in the value being used for CTL, $t_{target}$ is correspondingly reduced. Therefore, the present invention can proceed by either directly modifying the compressor stroke or by indirectly changing the compressor stroke by modifying the CTL.

Figure 3:
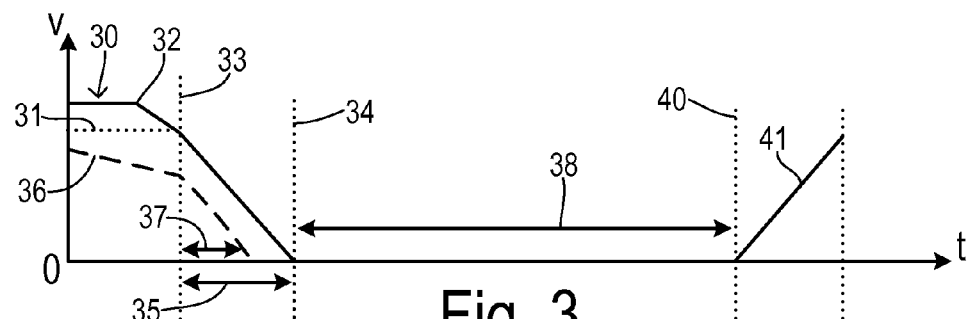
FIGS. 3-6 are graphs illustrating the change of respective variables over a time when the vehicle comes to a stop, remains at rest, and then accelerates.

Operation of the present invention will be described in further detail in connection with FIGS. 3-6. In FIG. 3, instantaneous vehicle speed is shown prior to, during, and after a stop event. A first example of vehicle speed is shown by a solid line 30. Initially, the vehicle is moving at a speed higher than a threshold speed 31. At a point 32, the driver begins braking so that line 30 shows a deceleration that eventually reaches speed threshold 31 at a time 33. The deceleration continues until a zero vehicle speed is obtained at a time 34. The magnitude of the deceleration from time 33 until time 34 is sufficiently large to satisfy the predetermined condition of the present invention, i.e., either the drop in speed over time is greater than a threshold or the movement of the brake pedal is greater than a threshold. Therefore, both conditions are satisfied once the speed drops to threshold 31. A stop event 35 between time 33 and time 34 is thus detected, and the invention accordingly adjusts the compressor stroke to obtain an optimized extra cooling of the evaporator during stop event 35.

Another example of a vehicle velocity profile is shown in FIG. 3 by a dashed line 36 which is below speed threshold 31 even before time 33. However, the magnitude of deceleration is below the threshold for detecting a stop event prior to time 33. At time 33, however, the deceleration increases thereby resulting in the detection of a stop event 37. Due to the fact that stop event 37 would be projected to end sooner than stop event 35 (as determined from the starting speed and deceleration), the increase in compressor stroke during stop event 37 would typically be larger than the increase adopted in stop event 35.

Once the vehicle reaches a stop (i.e., instantaneous speed becomes zero), it remains stopped during a stop time 38. The optimized extra cooling allows the engine to remain turned off for a longer time. When driving continues at a time 40, vehicle speed increases at 41 and operation of the compressor can continue as soon as it become needed.

Figure 4:
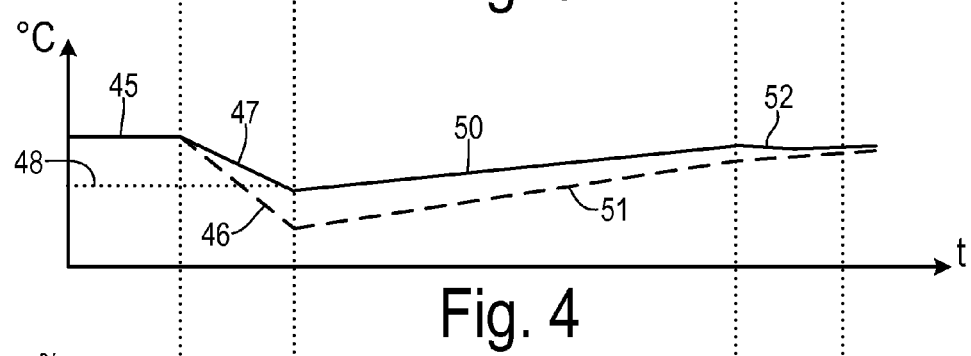

FIG. 4 shows evaporator temperature as a function of time. Initially, the evaporator temperature is being controlled along a line segment 45 at a substantially constant temperature according to a conventional CTL value. Upon detection of a stop-event, prior art systems that maximize regenerative cooling would go to maximum cooling and would provide a dropping evaporator temperature as shown at segment 46. The present invention that uses an optimized extra cooling which is typically less than maximum provides a dropping evaporator temperature along a segment 47 which reaches an optimized temperature 48 at the end of the stop event. When the engine is shut off during stop time 38, the evaporator temperature gradually increases as shown at segments 50 and 51 for the invention and the prior art, respectively. Due to overcooling, prior art segment 51 shows the evaporator temperature may continue to increase even after the engine restarts, reflecting the is unnecessary load that was placed on the engine during the stop event. In contrast, when the engine restarts using the embodiment of the present invention, no overcooling was obtained and now additional cooling is needed upon restart of the engine so that a further recovery of the evaporator temperature is needed as shown at segment 52.

Figure 5:
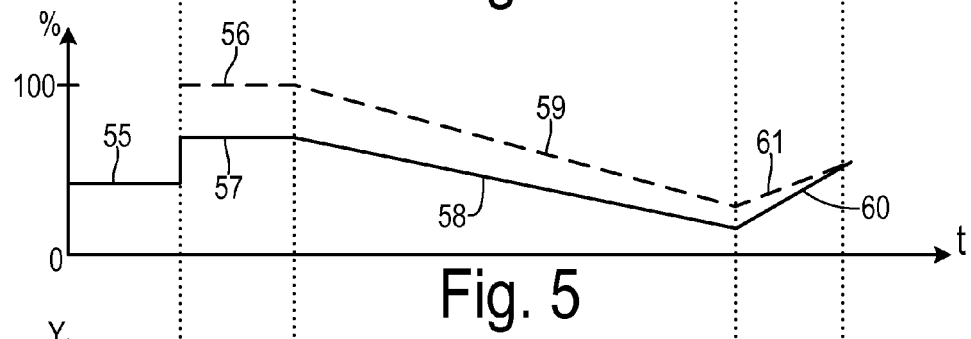

An example compressor stroke is shown in FIG. 5 as measured between 0% and 100% of full stroke. As an example, stroke may be running at about 50% while driving as shown at segment 55. In the prior art, upon detection of a stop-event the stroke is raised to 100% as shown at segment 56. In the present invention, stroke is raised to an intermediate value as shown at segment 57. The actual amount of this increase can be determined by various methods as described below. Once the engine is shut off at time 34, the compressor ceases operation and the last commanded stoke value begins to decrease because of loss of pressure as shown at line segments 58 and 59. Once the engine restarts, pressure is restored and the compressor stroke can move back to its newly commanded value as shown at segments 60 and 61.

The performance of the prior art maximization of the stroke may have many disadvantages. For example, if a target evaporator temperature is set to obtain maximum displacement in the compressor, then the target evaporator temperature may not have been reached by the time the vehicle actually comes to a stop. This may delay the shutting off of the engine because of the ongoing demand for cooling. By running the engine with the vehicle stopped, the fuel economy improvement sought by having a start-stop technology is compromised. Even if the engine is immediately shut off, additional unnecessary work is done by the compressor prior to engine shut-off, thereby increasing fuel consumption. Furthermore, the excessive cooling may cause discomfort to the occupants.

Figure 6:
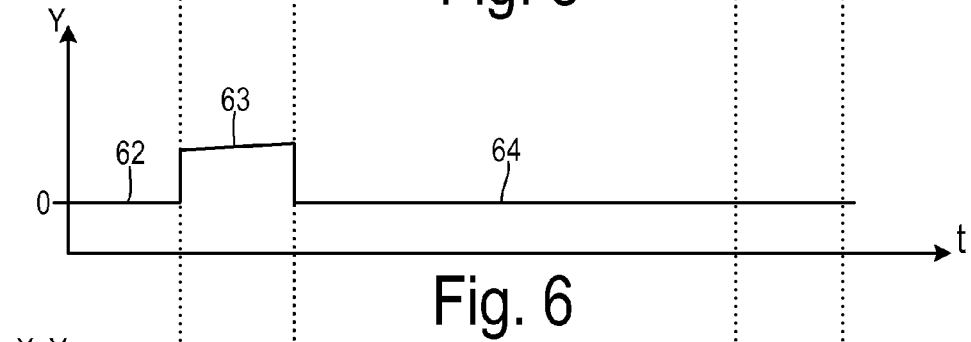

In order to achieve the optimized change in compressor stroke and evaporator temperature according to one embodiment, a quantity Y is determined as an adjustment factor. FIG. 6 shows that Y has a value of zero shown prior to the stop-event at segment 62, and a value of zero at segment 64 after the stop-event. During is the stop-event, Y has a non-zero value as shown at segment 63. Since the vehicle deceleration may not stay constant during a stop-event, the value of Y during segment 63 may either increase or decrease accordingly. Y may have a value that increases a current compressor stroke of around 50% to a compressor stroke between 70% and 90%, depending upon the time until stop (i.e., the duration of the stop-event) and other conditions. A shorter projected duration of the stop event would result in a greater increase in compressor stroke. For any particular vehicle design, the quantitative values for Y under different conditions may be determined empirically during design and testing of the vehicle, for example.

Figure 8:
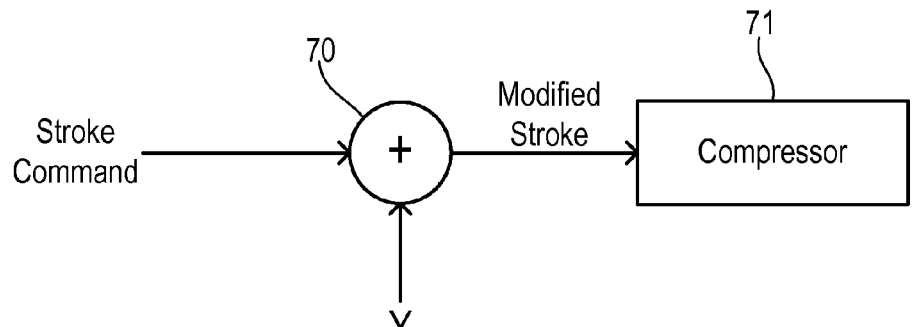
FIG. 8 is a block diagram showing one embodiment for modifying compressor operation during a stop event.

Based on a value of Y, the compressor stroke can be modified as shown in FIG. 8. Thus, a stroke command obtained from the air conditioning controller is provided to one input of an adder 70. The value Y is provided to the other input of adder 70 and a modified stroke command is output to a compressor 71. Steps may be taken (not shown) to ensure that the modified stroke command does not exceed 100% or does not reach a level that causes icing of the evaporator.

Figure 7:
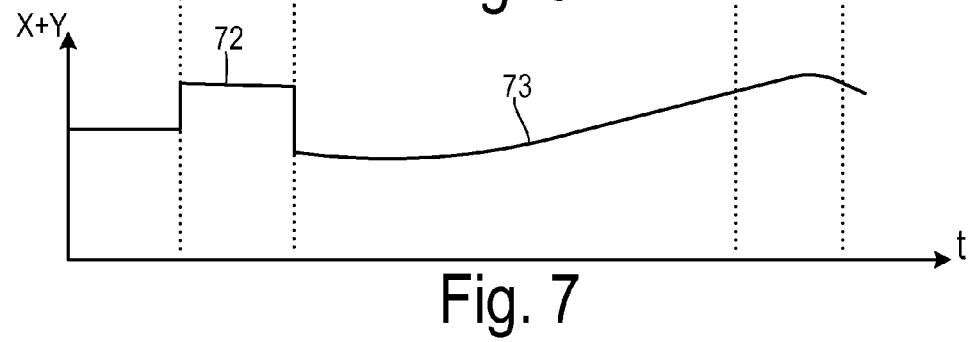
FIG. 7 is a graph showing the time variations of a modified Climate Thermal Load.

In a more preferred embodiment, the value of CTL being used to control air conditioning system operation may be modified as shown in FIG. 7. An unmodified CTL value obtained in a conventional manner is designated as having a value X. Control system operation is performed using a modified CTL value comprised of X+Y. As shown in FIG. 7, the sum X+Y has the conventional value prior to and after a stop-event since the value of Y is zero at those times. During the stop-event, however, the graph of FIG. 7 shows a modified CTL at a line segment 72. The increased CTL value causes the compressor to do additional work, thereby providing extra cooling into the evaporator. During stop time 38, the CTL value shown at segment 73 (after Y has returned to zero) may gradually increase in response to gradually increasing evaporator and internal temperatures. After engine restart, the CTL value may continue to rise temporarily until air conditioning operation recovers toward an equilibrium.

Figure 9:
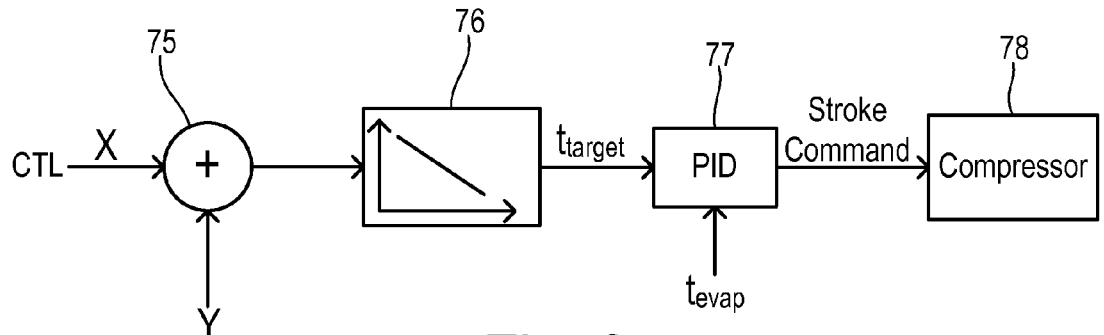
FIG. 9 is a block diagram showing another embodiment for modifying compressor operation during a stop event.

An embodiment using a modified CTL is shown in greater detail in FIG. 9. The conventional CTL value X is provided to one input of an adder 75 while adjustment factor Y is provided to another input. The output of adder 70 is coupled to a block 76 for transforming the modified CTL value to a target evaporator temperature. The actual evaporator temperature is compared to the target temperature in a controller 77 such as a proportional-integral-derivative (PID) controller. The resulting stroke command is provided to a compressor 78. When the value of Y is zero, then the air conditioning control loop operates in a conventional manner. When the value of Y is non-zero during a stop event, the evaporator target temperature and stroke command become optimized to achieve additional cooling to extend the engine off time during a vehicle stop.

Figure 10:
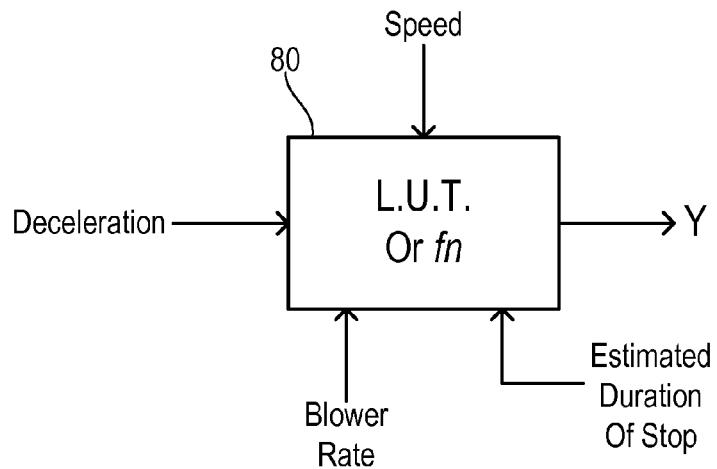
FIG. 10 is a block diagram showing preferred embodiments for obtaining an adjustment Y.

FIG. 10 illustrates a preferred derivation for a value of Y. A calculation block 80 receives an instantaneous speed signal and a magnitude of deceleration, which together indicate the expected time until the vehicle stops (at which time it becomes desirable to shut off the engine). The value of Y can be determined using just these two variables. In alternative embodiments, a blower rate and/or an estimated duration of a stop may also be used in determining a value for Y. Calculation block 80 may be based on a look-up table having values empirically determined during a design effort, or may include calculations involving the following functions. In particular, Y may be a function of the conventional CTL value X, vehicle speed, and deceleration rate according to the following formula:

$$Y = C_1 X + C_2 \frac{d}{v}$$

where d is the magnitude of deceleration and v is the instantaneous speed signal. $C_1$ and $C_2$ are constants determined for a particular system design.

The blower speed is an indication of the occupant's desire for cooling and also reflects the ability for storing cold in the evaporator over time. Thus, a higher blower speed would tend to increase the desired value for Y. Preferably, the blower speed may be expressed as a blower rate as a percentage of the maximum blower speed.

Values for Y may be determined either from a lookup table or by appropriate evaluation of functions according to an empirically chosen average engine off time during typical driving conditions. Alternatively, a dynamically estimated stop duration may be maintained by the vehicle in response to recent history of the vehicle usage, for example. The dynamically estimated duration can then be employed to determine the desired amount of extra cooling in order to maintain an engine off condition during the entire expected stop duration. An embodiment of a function for calculating a value of Y in response to all four of these variables is as follows.

$$Y = \left(C_1 X + C_2 \frac{d}{v} + C_3 B_{rate}\right) \frac{D_{est}}{D_{nom}}$$

where $B_{rate}$ is the blower rate, $D_{est}$ is the estimated stop duration and $D_{nom}$ is a nominal or default stop duration.

As previously mentioned, the magnitude of the deceleration can be determined in response to an absolute brake pedal angle or a rate of change in the pedal angle, which is especially to detect the initiation of a stop event. Alternatively, deceleration may be obtained by dividing the difference between two instantaneous speed measurements by the time difference between the measurements. By using an optimum compressor stroke based on an optimum evaporator temperature, less work is done by the compressor and less energy is used before the vehicle stops. Thus, the invention realizes fuel savings during the deceleration and during an extended off time after the vehicle stops.

The Climate Thermal Load as used herein can include any known factors for controlling the level of air conditioning cooling, including interior and exterior temperatures, sunload, and operator settings for a temperature and/or blower speed. The adjustment factor for modifying the CTL during a stop event preferably includes speed and deceleration, and may alternatively include blower rate and estimated duration of stop if applicable.

What is claimed is:

1. A vehicular air conditioning system for a vehicle having a start-stop technology, comprising:
   an evaporator;
   an evaporator temperature sensor for generating an evaporator temperature signal according to a temperature of the evaporator;
   an exterior temperature sensor for generating an exterior temperature signal according to a temperature outside of the vehicle;
   an occupant control element for setting an occupant demand signal;
   a variable displacement compressor driven by the engine and having a variable stroke for generating a variable amount of cooling of the evaporator in response to a stroke control signal;
   a vehicle speed sensor generating a speed signal according to an instantaneous speed of the vehicle; and
   a controller configured to receive the evaporator temperature signal and the speed signal, the controller 1) configured to determine a Climate Thermal Load (CTL) value in response to the exterior temperature signal and the occupant demand signal, 2) configured to determine an evaporator target temperature in response to the CTL value, 3) configured to vary the variable stroke to keep the evaporator temperature signal near the evaporator target temperature, 4) configured to detect a stop event of the vehicle in response to the speed signal being less than or equal to a threshold speed and the occurrence of a deceleration, and 5) configured to determine the evaporator target temperature during the stop event in response to a modified CTL value determined in response to the CTL value, the speed signal, and a magnitude of the deceleration.

2. The system of claim 1 wherein the controller is further configured to determine the adjustment to the CTL value in response to a blower speed in the vehicular air conditioning system.

3. The system of claim 1 wherein the controller is configured to maintain an estimated stopping duration, and wherein the controller is further configured to determine the adjustment to the CTL value in response to the estimated stopping duration.

4. The system of claim 1 wherein the controller includes a lookup table relating the speed signal and the magnitude of deceleration to corresponding values of the adjustment.

5. The system of claim 1 further comprising a brake pedal in the vehicle, wherein the controller is further configured to detect the occurrence of a deceleration in response to a predetermined action of the brake pedal of the vehicle.

6. The system of claim 5 wherein the brake pedal can be depressed through a range of brake angles, and wherein the predetermined action is a depression of the brake pedal to a predetermined brake angle.

7. The system of claim 5 wherein the brake pedal can be depressed through a range of brake angles, and wherein the predetermined action is a predetermined rate of change of the brake angle.

8. The system of claim 1 wherein the controller is further configured to detect the occurrence of a deceleration in response to a predetermined drop in the speed signal.

9. The system of claim 8 wherein the predetermined drop in the speed signal is comprised of a deceleration of the vehicle being greater than a threshold deceleration as determined from the speed signal.

10. The system of claim 1 further comprising an internal temperature sensor for generating an internal temperature signal according to a temperature inside the vehicle, wherein the controller is further configured to determine the CTL value in response to the internal temperature signal.

11. The system of claim 1 further comprising a sunload sensor for generating a sunload signal according to a solar radiation level impinging on the vehicle, wherein the controller is further configured to determine the CTL value in response to the sunload signal.

12. A method of controlling a variable stroke for a variable displacement compressor in an air conditioning system of a vehicle having start-stop technology, the method comprising the steps of:
   sensing an evaporator temperature of an evaporator of the air conditioning system;
   sensing an exterior temperature outside of the vehicle;
   setting an occupant demand for the air conditioning system;
   sensing an instantaneous speed of the vehicle;
   determining a Climate Thermal Load (CTL) value in response to the exterior temperature and the occupant demand;
   determining an evaporator target temperature in response to the CTL value;
   varying the variable stroke to keep the evaporator temperature near the evaporator target temperature;

detecting a stop event of the vehicle in response to the instantaneous speed signal being less than or equal to a threshold speed and the occurrence of a deceleration;

during the stop event, determining the evaporator target temperature in response to a modified CTL value determined in response to the CTL value, the instantaneous speed, and a magnitude of the deceleration.

13. The method of claim 12 further comprising the step of:

determining a blower speed of a blower within the air conditioning system;

wherein the adjustment to the CTL value is further determined in response to the blower speed.

14. The method of claim 12 further comprising the step of:

estimating a stopping duration during which the engine may be stopped;

wherein the adjustment to the CTL value is further determined in response to the estimated stopping duration.

15. The method of claim 12 wherein the step of determining the modified CTL value includes accessing a lookup table relating the instantaneous speed and the magnitude of deceleration to corresponding values of the adjustment.

16. The method of claim 12 further comprising the step of:

monitoring a brake pedal in the vehicle, wherein the occurrence of a deceleration is detected in response to a predetermined action of the brake pedal.

17. The method of claim 12 wherein the occurrence of a deceleration is detected in response to a predetermined drop in the instantaneous speed.

18. The method of claim 12 further comprising the step of:

sensing an internal temperature inside the vehicle;

wherein the CTL value is further determined in response to the internal temperature.

19. The method of claim 12 further comprising the step of:

sensing a sunload according to a solar radiation level impinging on the vehicle;

wherein the CTL value is further determined in response to the sunload.

20. A start-stop vehicle comprising:

a compressor with variable displacement;

a controller configured to determine a non-overcooling CTL value for controlling the variable displacement, detect a stop event in response to a speed of the vehicle, and increase the variable displacement during the stop event to overcool by an amount determined in response to the non-overcooling CTL value, the speed of the vehicle, and a measure of the deceleration of the vehicle.

* * * * *